United States Patent
Goel et al.

(10) Patent No.: US 10,565,778 B2
(45) Date of Patent: Feb. 18, 2020

(54) ELECTRONIC DEVICES FOR AND METHODS OF IMPLEMENTING MEMORY TRANSFERS FOR IMAGE WARPING IN AN ELECTRONIC DEVICE

(71) Applicants: Manish Goel, Plano, TX (US); Akila Subramaniam, Dallas, TX (US); Rahul Rithe, Cupertino, CA (US); Seok-Jun Lee, Allen, TX (US)

(72) Inventors: Manish Goel, Plano, TX (US); Akila Subramaniam, Dallas, TX (US); Rahul Rithe, Cupertino, CA (US); Seok-Jun Lee, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 81 days.

(21) Appl. No.: 15/682,777

(22) Filed: Aug. 22, 2017

(65) Prior Publication Data
US 2019/0066358 A1 Feb. 28, 2019

(51) Int. Cl.
| | |
|---|---|
| *G06K 9/00* | (2006.01) |
| *G06T 15/20* | (2011.01) |
| *H04N 5/225* | (2006.01) |
| *H04N 1/21* | (2006.01) |
| *G06F 13/10* | (2006.01) |
| *G06T 1/60* | (2006.01) |
| *G06T 3/00* | (2006.01) |

(52) U.S. Cl.
CPC ............ *G06T 15/20* (2013.01); *G06F 13/10* (2013.01); *G06T 1/60* (2013.01); *G06T 3/00* (2013.01); *H04N 1/2112* (2013.01); *H04N 5/225* (2013.01)

(58) Field of Classification Search
CPC ............ G11B 20/10527; G11B 20/12; G11B 2020/10657; G11B 2020/10537; G06T 15/20; H04N 5/225
See application file for complete search history.

(56) References Cited

U.S. PATENT DOCUMENTS

| | | | |
|---|---|---|---|
| 5,307,506 A * | 4/1994 | Colwell | G06F 13/4022 710/107 |
| 8,005,295 B2 | 8/2011 | Nobori | |
| 8,363,082 B2 * | 1/2013 | Schaffstein | G03G 15/326 347/237 |
| 9,042,675 B2 | 5/2015 | Ishii et al. | |
| 9,159,154 B2 | 10/2015 | Kim et al. | |
| 9,230,297 B2 | 1/2016 | Grossmann | |

(Continued)

FOREIGN PATENT DOCUMENTS

WO  WO2017007561  12/2017

OTHER PUBLICATIONS

Satya Mallick, Image Transfer Methods, Jan. 23, 2003.
(Continued)

*Primary Examiner* — Amir Alavi
(74) *Attorney, Agent, or Firm* — John King

(57) ABSTRACT

A method of implementing memory transfers for image warping in an electronic device is described. The method comprises receiving an input tile associated with an image; generating a geometric boundary around pixels of the input tile; and remapping the pixels in the geometric boundary to an output tile. An electronic device and a non-transitory computer readable storage medium for performing the method are also disclosed.

21 Claims, 5 Drawing Sheets

(56) References Cited

U.S. PATENT DOCUMENTS

| | | |
|---|---|---|
| 9,299,149 B2 | 3/2016 | Mel et al. |
| 9,305,211 B2 | 4/2016 | Kwon et al. |
| 9,330,438 B1 | 5/2016 | Levi, et al. |
| 9,355,438 B2 | 5/2016 | Mehta et al. |
| 9,374,565 B2 | 7/2016 | Gao et al. |
| 9,378,585 B2 | 7/2016 | Jung et al. |
| 9,389,679 B2 * | 7/2016 | Honji .................... G06F 3/0488 |
| 9,396,529 B2 | 7/2016 | Tsubota et al. |
| 2001/0015751 A1 * | 8/2001 | Geng .................. H04N 5/2259 |
| | | 348/36 |
| 2007/0217701 A1 * | 9/2007 | Liu ........................ G06K 9/38 |
| | | 382/234 |
| 2011/0149307 A1 * | 6/2011 | Tin ....................... H04N 1/6033 |
| | | 358/1.9 |
| 2012/0120430 A1 * | 5/2012 | Tsai ..................... H04L 63/083 |
| | | 358/1.13 |
| 2012/0330620 A1 * | 12/2012 | Sullivan ............. G05B 19/4069 |
| | | 703/1 |
| 2013/0058589 A1 | 3/2013 | Chai |
| 2014/0009568 A1 | 1/2014 | Stec |
| 2014/0161357 A1 | 6/2014 | Tsubaki |
| 2015/0304527 A1 | 10/2015 | Chou |
| 2016/0012303 A1 | 1/2016 | Jung et al. |
| 2016/0142655 A1 | 5/2016 | MacMillan |
| 2017/0309306 A1 * | 10/2017 | Subramaniam ........ H04N 19/00 |
| 2018/0316948 A1 * | 11/2018 | Todd .................. H04N 21/2365 |

OTHER PUBLICATIONS

Texas Instruments Application Report, 2010..
Smit et al, An Image-Warping VR-Architecture: Design, Implementation and Applications, Jan. 2008.
Evans, Efficient Implementation of Image Warping on a Multimedia Processor, Apr. 29, 1997.
Zhang et al, Memory System Support for Image Processing.

* cited by examiner

US 10,565,778 B2

ELECTRONIC DEVICES FOR AND METHODS OF IMPLEMENTING MEMORY TRANSFERS FOR IMAGE WARPING IN AN ELECTRONIC DEVICE

FIELD OF THE INVENTION

An embodiment of the present invention relates generally to electronic devices, and in particular to electronic devices for and methods of implementing memory transfers for image warping in an electronic device.

BACKGROUND OF THE INVENTION

With the increase in the use of cameras in electronic devices, such as mobile communication devices, there is also an increase in memory and processing requirements. Various factors may not only affect the quality of an image, but the processing requirements to process the image. For example, warping of an image recorded by the camera may often occur, such as for example by a distortion created by a lens of the camera. Warping may result in an image being rotated for example.

Image processing may be used to correct undesirable image warping, or introduce image warping as desired. That is, warping is a remapping of data associated with pixels of a captured image that may cause distortion, or may cause anti-distortion to correct unintentional distortion, such as distortion created by a lens. Therefore, where a lens of a mobile communication device such as a smart phone or tablet causes distortion, warping of the received image associated with input data can be applied to generate output data that is corrected. Because of the warping, a high bandwidth is typically required at the input of an image processing function for the camera to process the warped image.

Typically input and output tiles are described as rectangular tiles which includes a region of interest (ROI) in an input or output frame. For large warping effects (e.g., large rotations), the input bandwidth (BW) of a warped image is much larger than output BW of a corrected image. In a case of limited on-chip memory, smaller tile sizes exacerbates the problem because each tile has an associated overhead.

Accordingly, there is a need to reduce the input BW for an image captured by a camera to address warping of an image.

SUMMARY OF THE INVENTION

A method of implementing memory transfers for image warping in an electronic device is described. The method comprises receiving an input tile associated with an image; generating a geometric boundary around pixels of the input tile; and remapping the pixels in the geometric boundary to an output tile.

According to another embodiment, an electronic device is disclosed. The electronic device comprises a lens, and a processor coupled to the lens, wherein the processor configured to receive an input tile associated with an image; generating a geometric boundary around pixels of the input tile; and remapping the pixels in the geometric boundary to an output tile.

A non-transitory computer-readable storage medium having data stored therein representing instructions executable by a processor is also described. The instructions executable by a processor perform a method comprising receiving an input tile associated with an image; generating a geometric boundary around pixels of the input tile; and remapping the pixels in the geometric boundary to an output tile.

Other features will be recognized from consideration of the Detailed Description and the Claims, which follow.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

DETAILED DESCRIPTION

While the specification includes claims defining the features of one or more implementations of the invention that are regarded as novel, it is believed that the circuits and methods will be better understood from a consideration of the description in conjunction with the drawings. While various circuits and methods are disclosed, it is to be understood that the circuits and methods are merely exemplary of the inventive arrangements, which can be embodied in various forms. Therefore, specific structural and functional details disclosed within this specification are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting, but rather to provide an understandable description of the circuits and methods.

The circuits and methods set forth below reduce the bandwidth required to address image warping for imaging applications of mobile electronic devices. According to some embodiments, all of the required pixels are enclosed in a polygon rather than a vertical tile to reduce the bandwidth. Enclosing the pixels in a polygon may reduce the bandwidth requirement significantly, for example, the bandwidth requirement may be reduced by up to 6 times for Ultra High Definition (UHD) images processed at 60 fps and having warping at 45 degrees. Reducing the bandwidth makes real-time processing for image warping for high resolution and high frame rates and multi-frame use cases feasible. Methods of transferring pixels inside a polygon are also disclosed.

According to one implementation, a convex hull is identified for given set of pixels, where the pixels are transferred inside the polygon formed by convex hull. According to another implementation, a minimum bounding box, such as a rectangle, is determined, where the pixels are transferred inside a bounding box. A closed form expression may be used to reduce the complexity of convex hull calculations for rotations. Other embodiments may use mesh mode transfers, where a look up table is used to map output pixel indices to implement pixel indices. The various circuits and methods reduce memory bandwidth and power consumption in image processing and allow for real-time image processing to address image warping.

Figure 1:
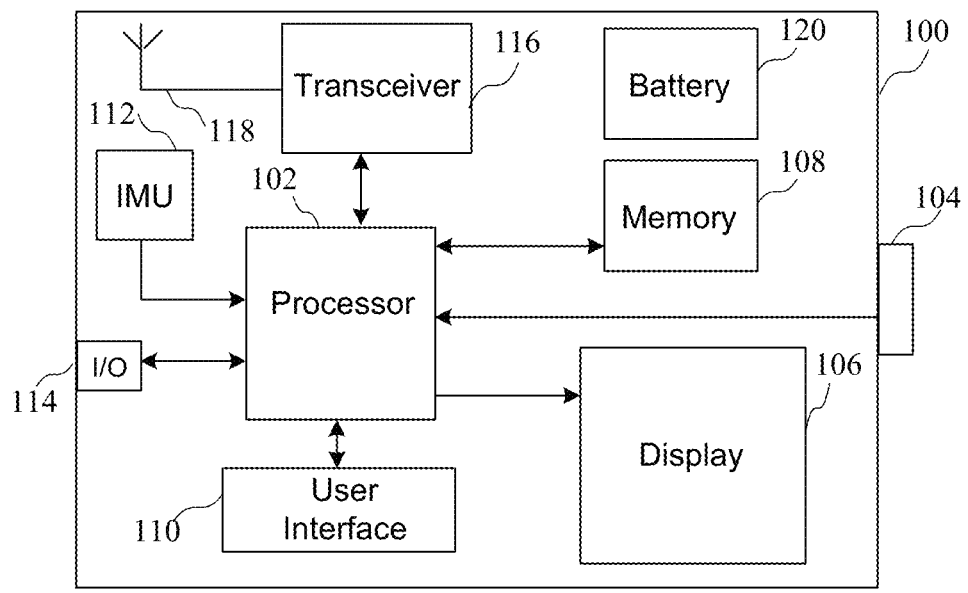
FIG. 1 illustrates an exemplary block diagram of an electronic device for implementing memory transfers for image warping.

Turning first to FIG. 1, an exemplary block diagram of an electronic device for implementing memory transfers for image warping is shown. In particular, a device 100 comprises a processor 102 coupled to an image sensor 104. The device 100 could be any type of electronic device, or a component of an electronic device such as an integrated circuit of a device or system, adapted to capture a digital image. The image sensor 104 could be a digital camera, or any portion of a digital camera, such as a lens or other image sensing element. While a single image sensor is shown, it should be understood that a plurality of image sensors could be employed. The processor could be coupled to a display 106 for displaying a captured image, and more particularly, displaying a digital image having enhanced image quality. The processor 102 is a hardware component (i.e., integrated electronic circuit) that executes a program. The processor 102 could be an ARM processor, an X86 processor, a MIPS processor, a graphics processing unit (GPU), a general purpose GPU, or any other processor configured to execute instructions stored in a memory. The processor 102 could be implemented in one or more processing devices, where the processors may be different. For example, the electronic device could include a central processing unit (CPU) as well as a GPU for example. The processor may implement an operating system (OS) that accesses software on the memory and receives various inputs, such as a camera for example. As will be described in more detail below in reference to FIG. 2, the processor, alone or in combination with other elements, can introduce or compensate for image warping.

The processor 102 may also be coupled to a memory 108 that enables storing information related to various frames of an image, or resulting digital images after introducing or compensating for warping. While a single memory is shown, it should be understood memory 108 could be implemented as a plurality of different memories, as will be described in more detail below. The memory 108 could include any type of memory, such as a solid-state drive (SSD) or Flash memory for example, or any other memory element that provides long term memory, where the memory could be any type of internal memory of the electronic drive or external memory accessible by the electronic device. That is, while single memory 108 is shown as a part of the electronic device, it should be understood that the memory or a portion of the memory could be implemented external to the electronic device. A user interface 110, which may be separate from the display, or also may be a part of, or responsive to, the display, is also shown. The processor 102 may also be coupled to other elements that receive inputs or enable the capturing of a digital image. For example, an inertial measurement unit (IMU) 112 can provide various information related to the motion or orientation of the device 100. The processor 102 may also receive input by way of an input/output (I/O) port 114 or a transceiver 116 coupled to an antenna 118. A battery 120 may be implemented to provide power to the processor and other elements of the device 100.

Figure 2:
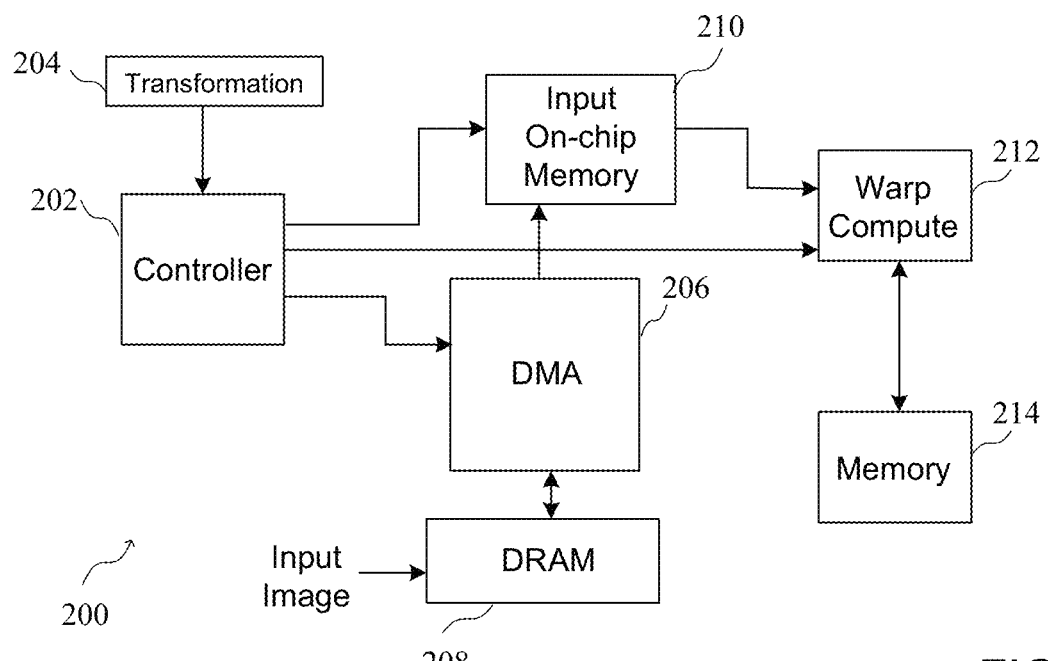
FIG. 2 illustrates an exemplary circuit implemented in an electronic device for implementing memory transfers for image warping.

Turning now to FIG. 2, an exemplary circuit 200 implemented in an electronic device for implementing memory transfers to introduce or compensate for image warping is shown. The circuit 200 may be implemented using elements of the device of FIG. 1, such as the processor 102 and the memory 108 for example. The circuit 200 comprises a controller 202 coupled to receive transformation information from a transformation circuit 204. The transformation information enables the transfer of pixels of an input image to an output image to introduce warping or compensate for a warping of an image for example. As will be described in more detail below, the transformation information enables the remapping of pixels of an input image to an output image. The controller 202 is also coupled to a direct memory access (DMA) circuit 206 which receives data which may be an input image from a memory, such as a dynamic random access memory (DRAM) 208. The controller also controls an input on-chip memory 210 and a warp compute circuit 212 that is coupled to a memory 214. The input on-chip memory may receive input image data stored in DRAM 208 by way of the DMA circuit 206. The warp compute circuit 212 computes the warping of an input image, as shown for example in FIGS. 3-5 and 7-8, and generate an output image that is stored in a memory 214. The output image may be a corrected image of a warped image generated at an input or an image having warping that is intentionally introduced.

Figure 3:
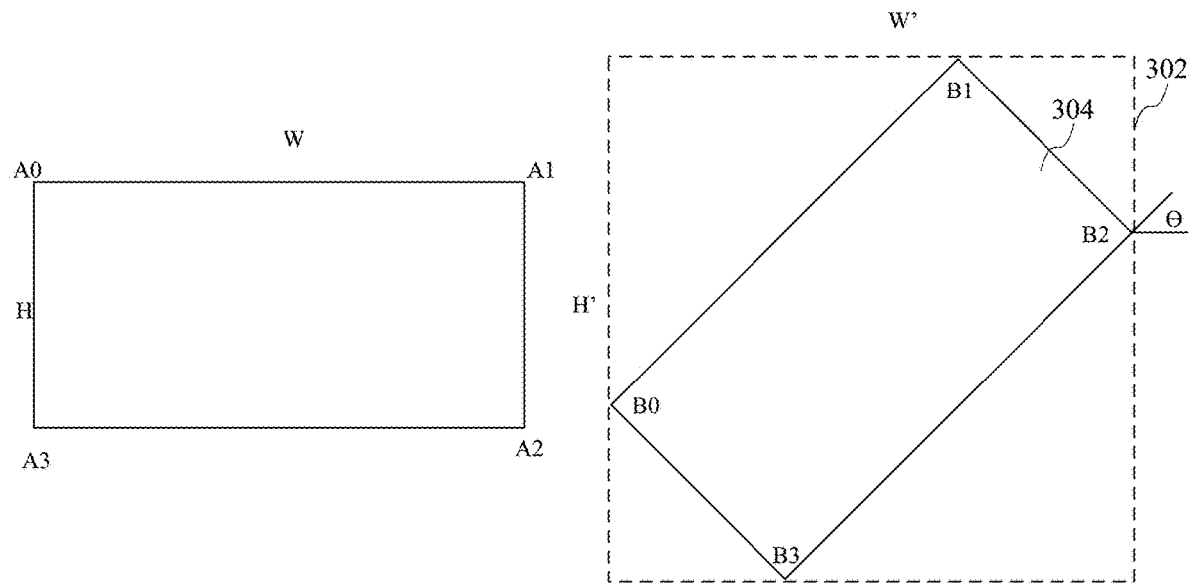
FIG. 3 illustrates a rotation of an input tile.

Turning now to FIG. 3, a rotation of an input tile is shown. According to the example of FIG. 3, assuming a 45 degree rotation of the image defined by a top left corner A0, a top right corner A1, a bottom right A2 and a bottom left corner A3, where a width (W) is defined between A0 and A1 and a height (H) is defined between A0 and A3, the received image which may be warped to have a 45 degree rotation as shown. As a result of the rotation, the width W' and the height H' of an area 302, such as a matrix for storing pixels associated with the image, is increased. For example, for an output tile with no rotation having 4 corners, A0=[0,0], A1=[W−1, 0], A2=[W−1, H−1], and A3=[0, H−1], the corners after a rotation of θ (theta) would be defined as $B_k=T*A_k$, where:

$T=[c,-s,s,c], c=\cos(\theta)$, and $s=\sin(\theta)$, $B0=[0,0]$, $B1=[(W-1)c,(W-1)s]$, $B2=[(W-1)c-(H-1)s,(W-1)s+(H-1)c]$, and $B3=[-(H-1)s,(H-1)c]$.

As can be seen in FIG. 3, a larger matrix as defined by W' and H' would be required to store the pixel data associated with the image. By compensating for the unintentional warping, the data associated with the image can be stored more efficiently.

According to various implementations, the circuit of FIG. 2 enables the transferring of data associated with an input image to points within a boundary, such as a convex hull or a bounding box. A convex hull comprises a set of outer points on a perimeter of a region of interest associated with input data for an image. The convex hull may be defined by a polygon to reduce the number of unnecessary pixels of the input data that are processed. A bounding box comprises a rectangle that includes the region of interest, and may include additional pixels of the input data that may not be in a region of interest. Although a bounding box may generally cover an area that is greater than necessary to process input data of the region of interest, the processing of data may be simplified by having a uniform area defining the bounding box, such as a rectangle, to more easily process the data which is a simple uniform area.

In order to compensate for an image that experiences warping, a Kalman filter can be used to estimate the translation, rotation, scaling or a change in perspective of the pixels of the image. That is, the translation, rotation, scaling or change in perspective of the pixels of the image can be described with equations, and therefore the processing of the image can be accomplished using lookup table (LUT) mapping. By way of example, the LUT mapping could be represented by:

$$y=f(x) \qquad \text{Equation (1)}$$

representing a transformation of the input image. According to one implementation, rotation of the image can be considered. When considering rotation, where only a height (h), width (w) and a rotation angle θ are known, the pixels associated with the image can be represented by:

$$\begin{vmatrix} x_i \\ y_i \end{vmatrix} = \begin{vmatrix} \cos\theta & -\sin\theta \\ \sin\theta & \cos\theta \end{vmatrix} \begin{vmatrix} x_0 \\ y_0 \end{vmatrix} \qquad \text{Equation (2)}$$

It should be noted that compensation for rotation is generally more difficult to accomplish than translation and scaling of an image, which generally involve a shifting. Rotation, translation and perspective can be taken into account according to:

$$\begin{vmatrix} x'_i \\ y'_i \\ z'_i \end{vmatrix} = \begin{vmatrix} a_{00} & a_{01} & a_{02} \\ a_{10} & a_{11} & a_{12} \\ a_{20} & a_{21} & 1 \end{vmatrix} \begin{vmatrix} x_0 \\ y_0 \\ 1 \end{vmatrix} \qquad \text{Equation (3)}$$

where $a_{00}$, $a_{01}$, $a_{10}$ and $a_{11}$ relate to rotation, $a_{02}$ and $a_{12}$ relate to translation, and $a_{20}$ and $a_{21}$ relate to perspective. Input coordinates for image are obtained as $$x_i = \frac{x'_i}{z'_i} \qquad \text{Equation (4)}$$

$$y_i = \frac{y'_i}{z'_i}$$

Because of the warping of the image, a transformation of the image could be achieved using the matrix transformations in equations (2), (3) and (4), which could be stored in the transformation circuit 204 for example. For the case of rotation only, $a_{02}$, $a_{12}$, and ago and $a_{21}$ are set to 0.

In implementing a convex hull, the input image can be scanned starting with a line at y=0 to determine a left-most point of the convex hull and a right-most point of the convex hull associated with pixels in a region of interest for a row of the image, and continue to determine the intersection points from y=0 to y=H'−1. For 64 byte granularity in DMA transfers, the intersection points for each row can be quantized to 64B boundaries, and determine the left-most data point and the right-most data point to identify the convex hull for the image.

According to one embodiment, the distortion by a lens of the camera is corrected after the image is detected. When large distortions need to be corrected, a mesh mode correction of the image can be achieved using a LUT. According to one embodiment, multiple images taken at different times or from a different angle can be aligned to look that same before they are combined to create a single image. If the images are taken from a different angle, it is possible to compensate for rotation to enable adding the images to create a composite image.

Figure 4:
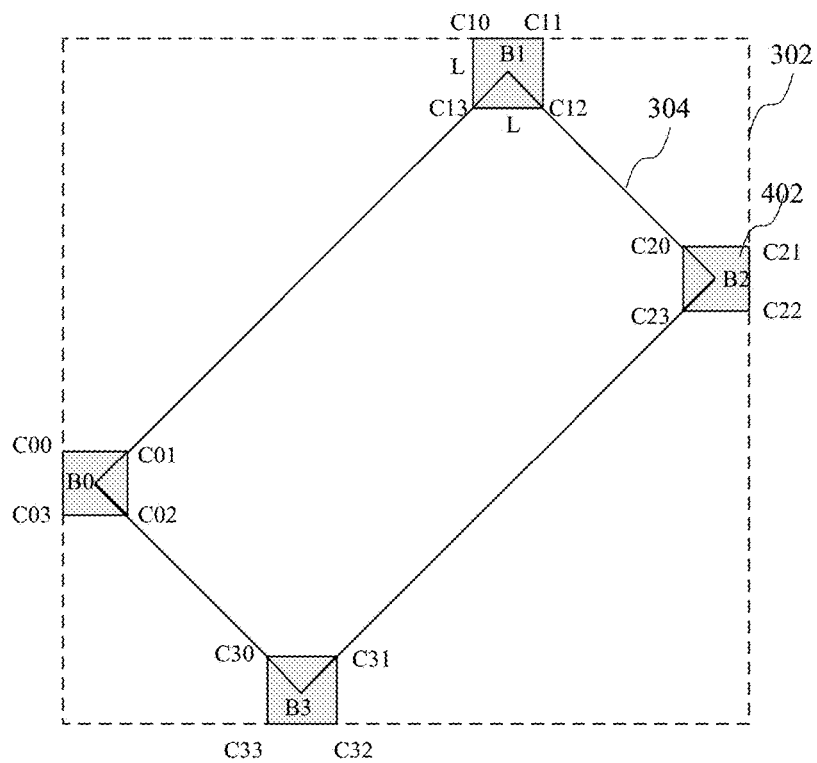
FIG. 4 illustrates a rotated input tile having bi-cubic filters.

As shown in FIG. 4, a rotated input tile having bi-cubic filters is shown. When implementing bi-cubic filtering, a square region having a length of a side of L at each of the 4 corners provides filtering samples near corner pixels to provide a better estimate of the pixels in those edge regions. A square portion for each of the corners Bn, the square is defined by $C_{n0}$, $C_{n1}$, $C_{n2}$ and $C_{n3}$, where $Cn0=Bn+(-L,-L)$, $Cn1=Bn+(L,-L)$, $Cn2=Bn+(L,L)$, and $Cn3=Bn+(-L,L)$.

Figure 5:
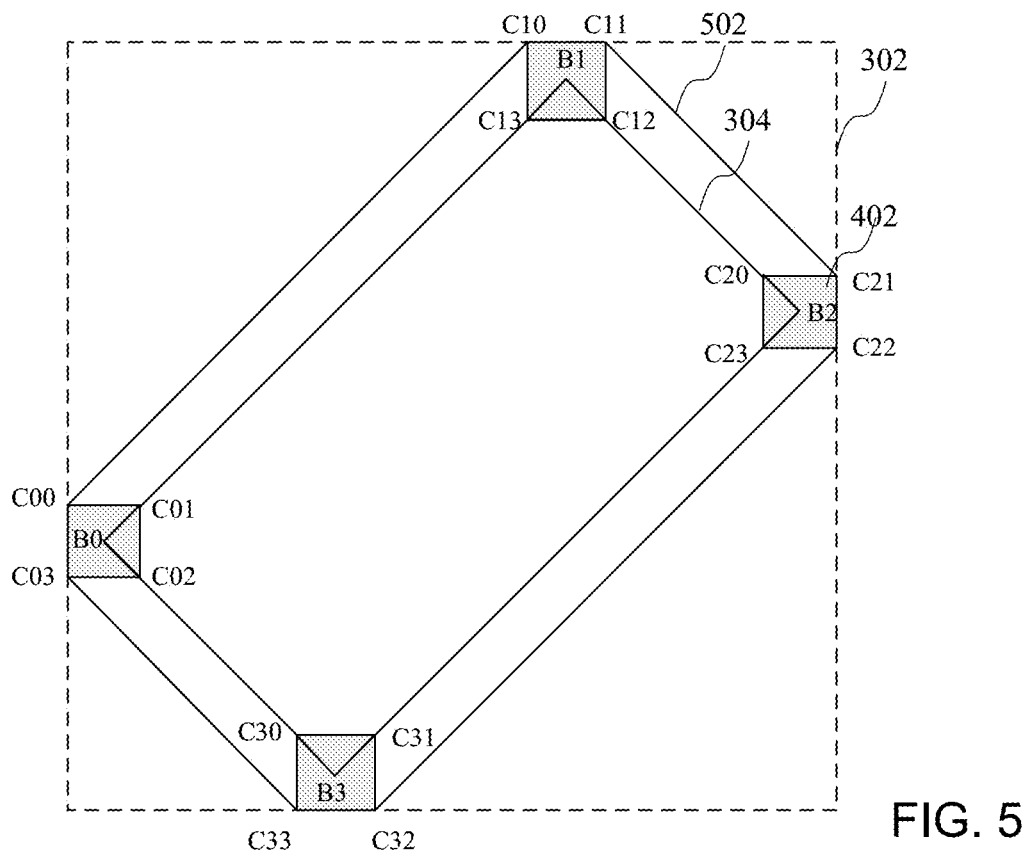
FIG. 5 illustrates a convex hull associated with a rotated input tile.

As shown in FIG. 5, a convex hull associated with a rotated input tile is defined to include a ROI encompassing the squares. While a polygon associated with a bi-cubic filter squares at four corners of a rectangle, it should be understood that a region of interest could be a shape other than a rectangle, and squares of the bi-cubic filter could define a polygon other than a rectangle and could be at more than 4 locations.

Figure 6:
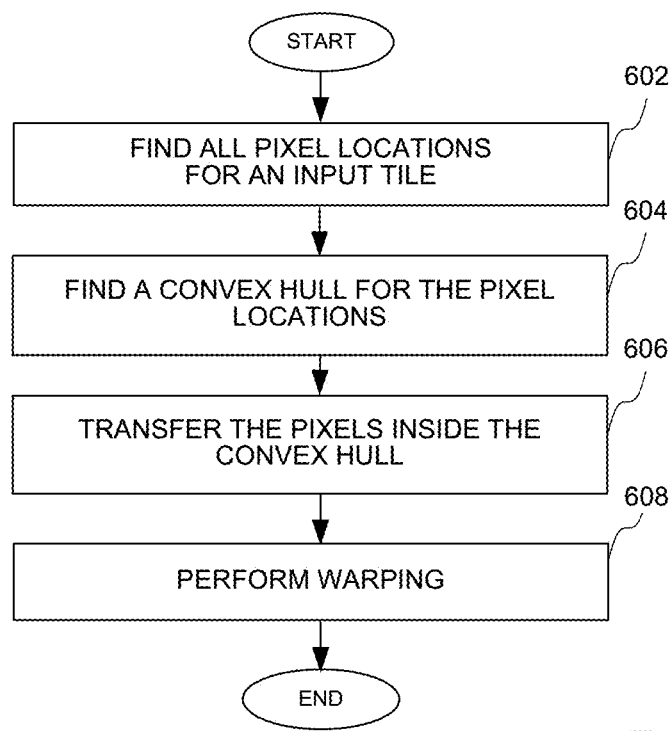
FIG. 6 is an exemplary flow diagram of a method of performing warping using an image having a convex hull.

Turning now to FIG. 6, an exemplary flow diagram of a method of performing warping using an image having a convex hull is shown. All pixel locations for an input tile are found at a block 602. A convex hull for the pixel locations is found at a block 604. The pixels inside the convex hull are transferred at a clock 606. Warping is performed at a block 608. By way of example, the pixels in the convex hull maybe transferred to a rectangular tile, where the warped output is a rectangular tile having width W and a height H, which are less than the width W' and the height H' as shown in FIG. 3.

In order to transfer of points inside a polygon, for row=1: 1:nrow, it is first necessary to find intersection with each of the n sides for convex polygon as col(row,1:npts), npts=1, 2, 3 or 4. It is then necessary to find mincol(row) and maxcol(row) of the intersection points, where mincol(row)=min(col(row,:)) and maxcol(row)=max(col(row,:)). The pixels at locations [mincol(row),maxcol(row)] are then transferred. If DMA transfers are based on bursts (e.g., 64B bursts), convert transfer to burst addresses as follows:

Mincol_aligned(row)=burst_size*floor(mincol(row)/burst_size), and

Maxcol_aligned(row)=burst_size*floor(maxcol(row)/burst_size).

Figure 7:
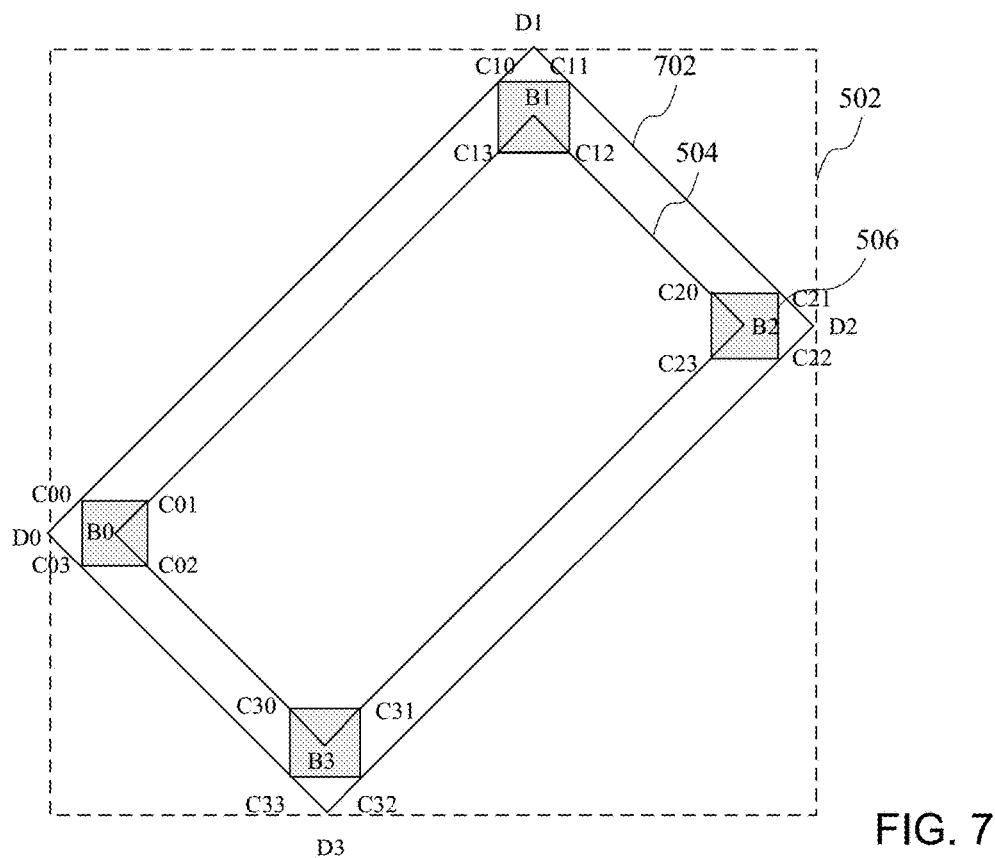
FIG. 7 illustrates a bounding box associated with a rotated input tile.

Turning now to FIG. 7, a bounding box associated with a rotated input tile is shown. A minimum bounding box for rotations can be defined by $D0=B0+(-h0,-h1)$, $D1=B1+(h1,-h0)$, $D2=B2+(h0,h1)$, and $D3=B3+(-h1,h0)$.

Figure 8:
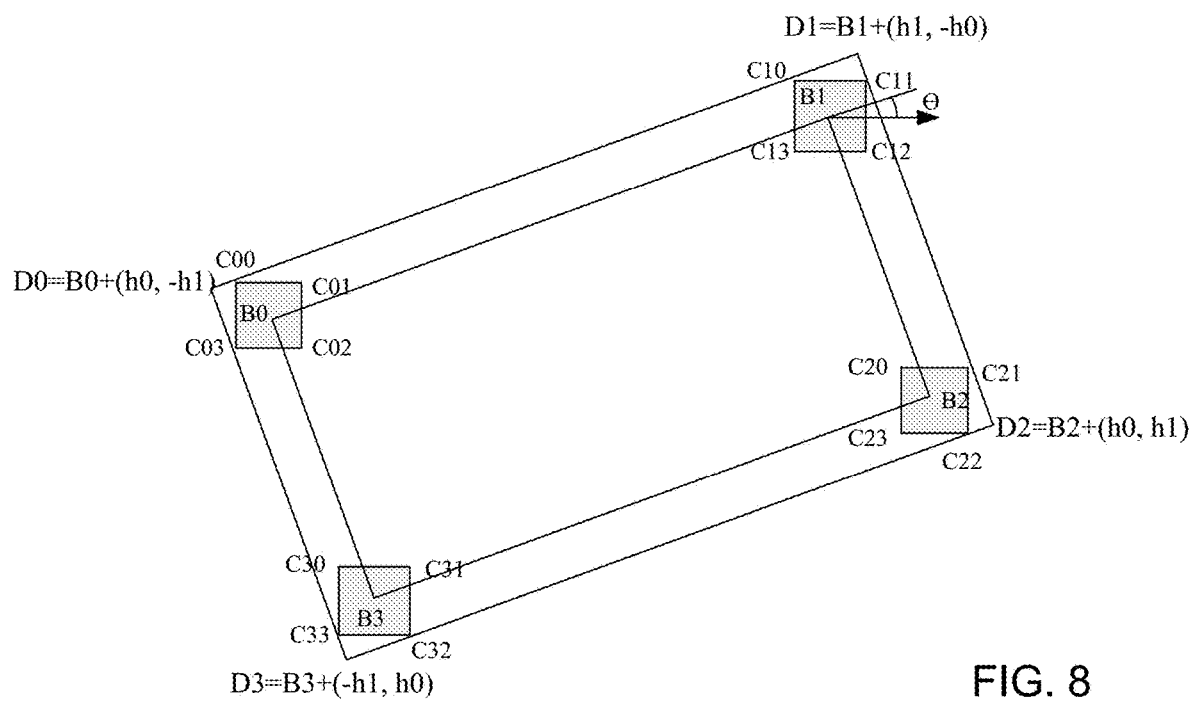
FIG. 8 illustrates another bounding box associated with a rotated input tile.

For a 2L×2L window and the image being rotated by an angle θ as shown in FIG. 8, h0=L*(1+sin(2*θ) and h1=L cos(2*θ)), where $h1=L\cos(2*\theta)$, and $h0=1+\sin(2*\theta)'$ where the area of the bounding box is greater that the area of the convex hull.

Figure 9:
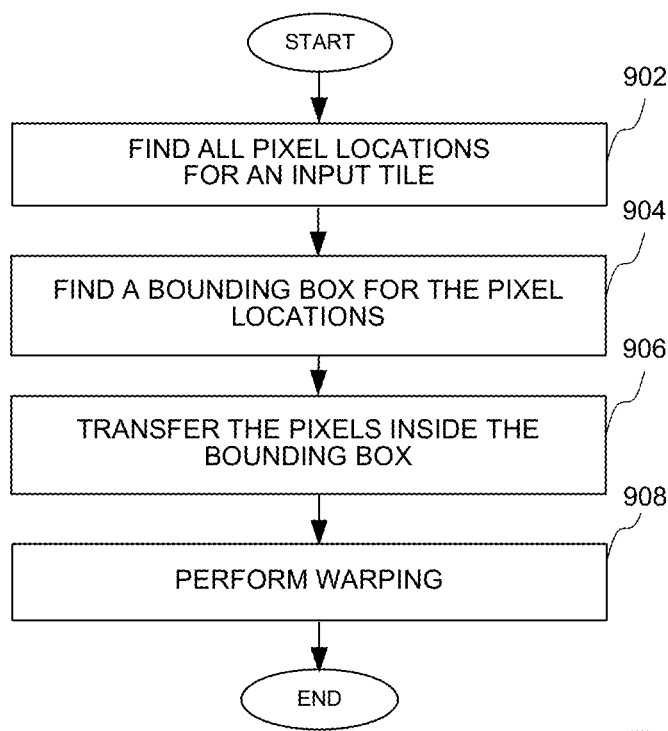
FIG. 9 is an exemplary flow diagram illustrating a method of performing warping using an image having a bounding box.

Turning now to FIG. 9, an exemplary flow diagram illustrating a method of performing warping using an image having a bounding box is shown. All pixel locations for an input tile are found at a block 902. A bounding box for the pixel locations is found at a block 904. The bounding box may be implemented as shown for example in FIG. 5. The pixels are transferred inside the bounding box at a block 906. Warping is performed at a block 908. The warping can be performed to either introduce warping or compensate for warping of an image, such as warping caused by a lens of an electronic device for example.

Figure 10:
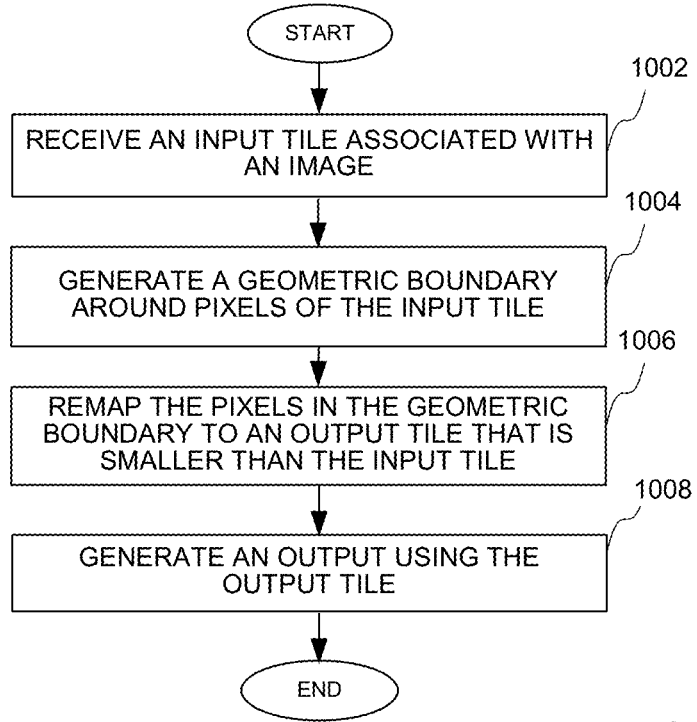
FIG. 10 is an exemplary flow diagram illustrating a method of implementing memory transfers for image warping in an electronic device.

Turning now to FIG. 10, is an exemplary flow diagram illustrating a method of implementing memory transfers for image warping in an electronic device is shown. An input tile associated with an image is received at a block 1002. A geometric boundary around pixels of the input tile is generated at a block 1004. The geometric boundary could be a convex hull or a bounding box as described above. The pixels in the geometric boundary are remapped to an output tile at a block 1006. An output is generated using the output tile at a block 1008. As described above in reference to FIG. 3, reducing the warping can result in an output tile having pixels associated with an image that is smaller than the input tile.

Though embodiments have been described with reference to certain versions thereof; however, other versions are possible. Therefore, the spirit and scope of the embodiments should not be limited to the description of the preferred versions contained herein.

It can therefore be appreciated that new devices for and methods of implementing a method of implementing memory transfers in an electronic device have been described. It will be appreciated by those skilled in the art that numerous alternatives and equivalents will be seen to exist that incorporate the disclosed invention. As a result, the invention is not to be limited by the foregoing embodiments, but only by the following claims.

We claim:

1. A method of implementing memory transfers for image warping in an electronic device, the method comprising:
   receiving an input tile comprising a matrix of pixels associated with an image, wherein the matrix of pixels comprises a height and a width associated with a first area of the matrix;
   generating, using a processor, a geometric boundary around pixels of the input tile to perform a memory transfer associated with image warping; and
   remapping data associated with the pixels of the input tile associated with the image in the geometric boundary to an output tile;
   wherein the geometric boundary is formed within the matrix and comprises a second area that is less than the first area; and
   wherein the output tile is smaller than the input tile.

2. The method of claim 1 wherein the geometric boundary comprises a convex hull.

3. The method of claim 1 wherein the geometric boundary comprises a bounding box.

4. The method of claim 1 wherein the remapping of the data associated with the pixels in the geometric boundary comprises implementing a lookup table.

5. The method of claim 1 wherein the remapping of the data associated with the pixels in the geometric boundary comprises implementing a function that accounts for at least one of rotation, translation or perspective.

6. The method of claim 1 wherein the remapping of the data associated with the pixels in the geometric boundary comprises identifying minimum and maximum values along rows of the geometric boundary.

7. The method of claim 1 wherein the remapping of the data associated with the pixels in the geometric boundary comprises compensating for distortion caused by a lens of the electronic device.

8. An electronic device, comprising:
a lens;
a processor coupled to the lens, the processor configured to:
receive an input tile comprising a matrix of pixels associated with an image, wherein the matrix of pixels comprises a height and a width associated with a first area of the matrix;
generate a geometric boundary around pixels of the input tile to perform a memory transfer associated with image warping; and
remap data associated with the pixels of the input tile associated with the image in the geometric boundary to an output tile;
wherein the geometric boundary is formed within the matrix and comprises a second area that is less than the first area; and
wherein the output tile is smaller than the input tile.

9. The electronic device of claim 8 wherein the geometric boundary comprises a convex hull.

10. The electronic device of claim 8 wherein the geometric boundary comprises a bounding box.

11. The electronic device of claim 8 wherein the remapping of the data associated with the pixels in the geometric boundary comprises implementing a lookup table.

12. The electronic device of claim 8 wherein the remapping of the data associated with the pixels in the geometric boundary comprises implementing a function that accounts for at least one of rotation, translation or perspective.

13. The electronic device of claim 8 wherein the remapping of the data associated with the pixels in the geometric boundary comprises identifying minimum and maximum values along rows of the geometric boundary.

14. The electronic device of claim 8 wherein the remapping of the data associated with the pixels in the geometric boundary comprises compensating for distortion caused by a lens of the electronic device.

15. A non-transitory computer-readable storage medium having data stored therein representing instructions executable by a processor to perform a method comprising:
receiving an input tile comprising a matrix of pixels associated with an image, wherein the matrix of pixels comprises a first height and a first width associated with a first area of the matrix;
generating a geometric boundary around pixels of the input tile to perform a memory transfer associated with image warping; and
remapping data associated with the pixels of the input tile associated with the image in the geometric boundary to an output tile;
wherein the geometric boundary is formed within the matrix and comprises a second area that is less than the first area; and
wherein the output tile is smaller than the input tile.

16. The non-transitory computer-readable storage medium of claim 15 wherein the geometric boundary comprises a convex hull.

17. The non-transitory computer-readable storage medium of claim 15 wherein the geometric boundary comprises a bounding box.

18. The non-transitory computer-readable storage medium of claim 15 wherein the remapping of the data associated with the pixels in the geometric boundary comprises implementing a lookup table.

19. The non-transitory computer-readable storage medium of claim 15 wherein the remapping of the data associated with the pixels in the geometric boundary comprises implementing a function that accounts for at least one of rotation, translation or perspective.

20. The non-transitory computer-readable storage medium of claim 15 wherein the remapping of the data associated with the pixels in the geometric boundary comprises identifying minimum and maximum values along rows of the geometric boundary.

21. The non-transitory computer-readable storage medium of claim 15 wherein the remapping of the data associated with the pixels in the geometric boundary comprises compensating for distortion caused by a lens of the electronic device.

* * * * *